United States Patent
Vo-Dinh et al.

(10) Patent No.: US 6,422,998 B1
(45) Date of Patent: Jul. 23, 2002

(54) FRACTAL ANALYSIS OF TIME VARYING DATA

(75) Inventors: Tuan Vo-Dinh, Knoxville, TN (US); Ajit Sadana, Oxford, MS (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/398,703

(22) Filed: Sep. 20, 1999

(51) Int. Cl.$^7$ .................................................. A61B 5/00
(52) U.S. Cl. ....................................................... 600/300
(58) Field of Search ................................. 600/300, 480, 600/479, 485, 487, 561, 323, 509, 512; 128/897, 898; 356/41; 702/28; 382/133; 364/413.08, 413.1, 496

(56) References Cited

U.S. PATENT DOCUMENTS 5,579,774 A * 12/1996 Miller et al. ................. 600/480
5,588,427 A * 12/1996 Tien ............................. 600/323
5,694,942 A * 12/1997 Escalona ...................... 600/509
5,719,784 A * 2/1998 Clark et al. .................... 702/28

OTHER PUBLICATIONS

Badwall, R., "The application of fractal dimension to temporomandibular joint sounds," Computers in Biology and Medicine, vol. 23, pp. 1–14, U.K., (1993).

Esteller, R., et al., "Fractal dimension characterizes seizure onset in epileptic patients," 1999 IEEE International Conference on Acoustics, Speech and Signal Processing Proceedings, Phoenix, AZ, pp. 15–19 (3/1999).

* cited by examiner

*Primary Examiner*—Kevin Shaver
*Assistant Examiner*—Brian Szmal
(74) *Attorney, Agent, or Firm*—Akerman, Senterfitt & Eidson, P.A.

(57) ABSTRACT

Characteristics of time varying data, such as an electrical signal, are analyzed by converting the data from a temporal domain into a spatial domain pattern. Fractal analysis is performed on the spatial domain pattern, thereby producing a fractal dimension $D_F$. The fractal dimension indicates the regularity of the time varying data.

27 Claims, 2 Drawing Sheets

FRACTAL ANALYSIS OF TIME VARYING DATA

STATEMENT REGARDING FEDERALLY SPONSORED RESEARCH OR DEVELOPMENT

This invention was made under governmental support under contract DE-AC05-96OR22464 awarded by the U.S. Department of Energy to Lockheed Martin Energy Research Corporation, and the United States Government has certain rights in this invention.

BACKGROUND OF THE INVENTION

The present invention relates to analysis of time varying data; and to analysis techniques based on fractals.

Frequently a time varying signal is required to be analyzed to extract characteristics of interest. For example, medical diagnosis often requires the analysis of time varying cardiac, respiratory, or brain signals in order to detect cardiac, pulmonary, or mental problems. In industrial control, electrical sensors produce signals in response to sensed parameters which occur over time in a manufacturing process and a control system responds to characteristics detected in the resultant signals. In general, most temporal processes are analyzed using Fourier Transform technique (frequency domain), chaos dynamics (position-velocity phase plane) and other complex mathematical techniques have been applied to signal analysis. A common drawback of these methods is that they are often complex, not easily amenable to analysis, and require some data pre-processing procedures, such as filtering, etc. Thus there remains a need for simple and practical methods for analyzing such time varying electrical signals.

Images and shapes within images which cannot be represented by Euclidean geometry have been analyzed by Fractal geometry. The term "fractals" is derived from the Latin word fractus, the adjectival form of frangere, or "to break". Unlike conventional geometry, which deals with lines, triangles, circles, spheres and cones, fractal geometry is concerned with broken or "fractured" shapes as so commonly found in nature. Such shapes simply do not vary in degree from conventional geometry (for example, clouds that are not spheres, trees that are not cones, and rivers that do not run straight). The concept of fractals and related applications has been established by Mandelbrot in his pioneering book "The Fractal Geometry of Nature" (Mandelbrot, 1982).

Fractals have been used to describe objects and geometrical formations. Many structures exhibit an underlying geometric regularity, known as scale invariance or self-similarity, that is the tendency of natural forms to repeat themselves, as with the resemblance and shape between large branches of a tree and small twigs. If these objects are observed at different size scales, there is the same fundamental pattern that is encountered. This repetitive pattern defines the fractional, or fractal dimension of the object structure, Avnir. D., Editor, *The Fractal Approach To Heterogeneous Chemistry: Surfaces, Colloids, Polymers*, J. Wiley & Sons, New York 1992. Fractals exhibit the property of self similarity. The shapes do not have to be identical. Fractal systems accommodate structures within structures and occupy more space than ordered systems. Fractal analysis of antigen-antibody binding kinetics have been utilized to enhance the performance of biosensors (Sadana, Alarie and Vo-Dinh, 1995).

Chaos refers to a constrained type of unpredicted turbulent dynamics. Chaotic systems are characteristically very sensitive to initial conditions. Chaotic vibrations appear when some strong non-linearity occurs in the system. Chaotic vibrations have been observed in many physical systems, such as closed and open-flow fluid problems, chemical reactions, acoustic systems, cardiac oscillations, and earthquake dynamics. Skinner emphasizes that all fractal dimensional systems are chaotic, and that the data they generate will be aperiodic, complex, and apparently unpredictable (Skinner, "Low-Dimensional Chaos in Biological Systems", *Bio/Technology*, 12, 596–600 1994). The analysis of the dynamics of human biomedical or biological signals is an important area of investigation to help control and to be able to predict the onset of pathological conditions. Chaotic behavior is exhibited by the heart in electrocardiogram signals and by the brain in electroencephalogram (EEG) signals. It has been emphasized that the demonstration of chaotic behavior in humans opens out the possibility of rapid diagnosis and effective therapeutic control of conditions ranging from epilepsy to cardiac arrest. What is required is a practical method or procedure that utilizes or translates chaos and/or fractal theory concept into a simple and straightforward manner to help distinguish between normal and pathological behavior.

The composition of a physical material is often analyzed using spectroscopy, such as techniques based upon ultra-violet or infra-red absorption, and Raman scattering. Normal Raman spectroscopy relates to the scattering of usually monochromatic incident radiation by a gas, liquid or solid which produces a shift in frequency or wavelength. Upon irradiation of a molecule with light in biological applications, the incident radiation having a frequency n should produce scattered radiation, the most intense part of which has unchanged frequency (Rayleigh scattering). In addition, if the polarization of a molecule changes as it rotates or vibrates, there are spectral lines of much lesser intensity at frequencies $n \pm n_K$, where $n_K$ is the molecular frequencies of rotation or vibration.

The results of Raman spectroscopy are frequently depicted in a two-dimensional image which is interpreted by human inspection. Thus it is desirable to provide a more efficient and repeatable analysis method for the Raman image.

SUMMARY OF THE INVENTION

The present invention involves a novel approach of using fractal techniques to analyze temporal events by conversion of representative temporal signals into spatial patterns. The proposed method of Fractal Analysis with Space—Time (FAST) coordinate conversion is based on the concept that, when the temporal signal of a process is converted into a spatial pattern, the element of this spatial pattern can be characterized and analyzed by fractal geometry. This time-space conversion process is consistent with the concept that scale invariance has some parallel in chaos theory, which is generally used to analyze many temporal processes, such as atmospheric turbulence, cardiac rhythms, or mechanical operations. In fact, it has been indicated that chaotic behavior is present in quite a few biological processes that are occurring in the human body, and these give rise to the fractal structures that are prevalent in the body, Goldberg et al., "Chaos and Fractals in Human Physiology", *Scientific American*, pp. 43–49, February 1990. In fact, relently fractal geometry has been referred to as the fourth dimension of life, West et al., *American Science*, vol. 284, p4, June 1999.

Fractal structures are often believed to be derived from the remnants of chaotic nonlinear dynamics. Quantitative tests for chaotic dynamics involve the analysis of several parameters, including the Lyapunov exponent and the fractal dimension in the phase space (Moon, Moon, F. *Chaotic and Fractal Dynamics*, Wiley, NY 1992). Although an interrelationship between chaos and fractal dynamics has been known, the concept of using fractal geometry directly to analyze a temporal process following space-time coordinate conversion, is not believed to have been suggested or used previously. The space-time conversion method is a direct, simple, and rapid process that does not require complex and time-consuming data conversion into the phase space.

Specifically characteristics of time varying data, such as an electrical signal, are analyzed by converting the data from a temporal domain into a spatial domain pattern. This may be accomplished by graphically plotting the time varying data as a two-dimensional image which then is scanned into a computer, or by electronically transforming the data into an image in the computer. Fractal analysis then is performed on the spatial domain pattern, thereby producing a fractal dimension $D_F$ which indicates the regularity or heterogeneity of the time varying data.

This technique has practical applicability in analyzing physiological data to diagnose disease in animals.

DETAILED DESCRIPTION OF THE INVENTION

Figure 1:
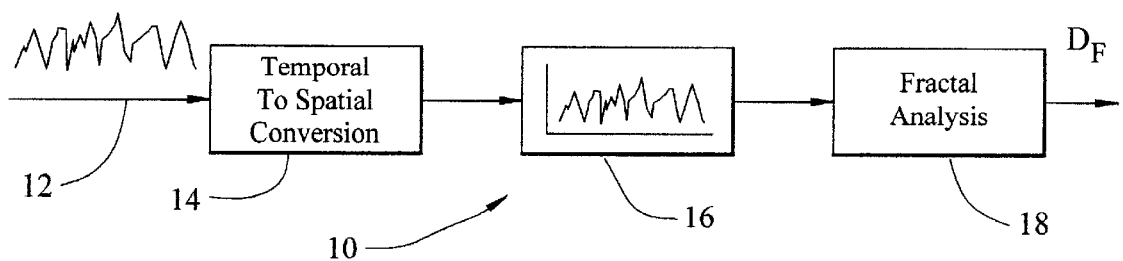
FIG. 1 is a schematic representation of the present fractal analysis technique for a time-varying signal.

Fractal analysis with space-time coordinate conversion 10 is schematically illustrated in FIG. 1. The input 12 to the process is a time varying electrical signal representing the physical events to be analyzed. For example the input 12 may be a time domain signal produced by medical equipment, such as an electrocardiogram, or by sensors of a manufacturing process wherein the signal represents a time varying phenomenon. The electrical signal is converted at block 14 from the temporal domain into the spatial domain producing a two-dimensional image 16. The results of the temporal to spatial domain conversion are represented by a physical plot on paper or a bit map image of the data can be stored in a computer memory as will be described. The two-dimensional image 16 then is processed by conventional fractal image analysis techniques which produces a fractal dimension DF as the output of the process. The fractal image analysis may be performed using any commercially available software program, such as FractalVision™ licensed by Cedar Software, Wolcott, Vt. U.S.A.).

In fractal image analysis at block 18, physical dimension such as lengths or surfaces are not meaningful measures for fractals. In general, the dimension of a fractal is associated with the extent on how it fills space. This intuitive or geometric definition of fractal dimension is often referred to "capacity" or "box-counting" dimension. Other definitions of fractal dimension have been discussed (Mandelbrot, *Fractals, Forms, Chance and Dimension*, W. H. Freeman, San Francisco (1977); Farmer, et al., The dimension of chaotic attractions, Festuca, 7D, 153–157 (1983); and Feder, *Fractals*, Plenum, NY (1988).

The principle of the box counting method involves counting non-empty artifically defined boxes in the image (areas having small dots) for various patterns such as straight lines, irregular curves, and geometric shapes. Consider a straight line which consists of a uniform distribution of $N_0$ points along the one-dimensional horizontal line in a three-dimensional space. Small cubes with dimension d are then used to cover the straight line (one can also use small spheres of radius r). The minimum number of such cubes N(d) to cover the points of a straight line is inversely proportional to d (i.e., the smaller the value of d, the greater number of cubes is required):

$$N(d) \approx 1/d \qquad (1)$$

Similarly, for a line with points distributed on a two-dimensional surface in three-dimensional space, the minimum number of cubes required to cover the line is inversely proportional to $d^2$ (i.e., on the two-dimensional surface, as the cube face area decreases, more cubes are needed). In other terms, the minimum number of cubes to cover the set will scale in accordance with the following law:

$$N(d) \approx 1/d^2 \qquad (2)$$

The dimension of the scaling law is defined as follows:

$$N(d) \approx 1/d^f \qquad (3)$$

To define a capacity dimension f, equation (3) may be written as:

$$f \approx \log N(d)/\log (1/d)$$

with: $N(d) \to \infty$
$D \to 0$

A pattern or a set of points are said to be fractal, if its capacity dimension f is non-integer, hence the term "fractal dimension".

Figure 2:
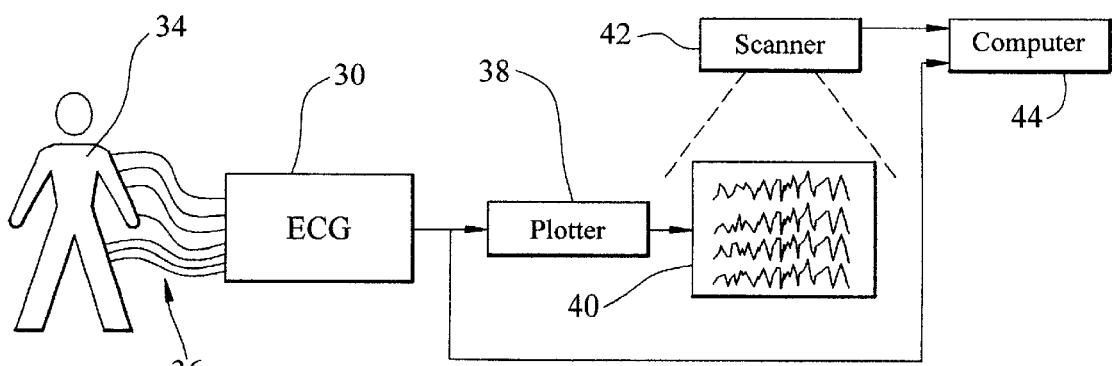
FIG. 2 schematically depicts an electrocardiogram which employs the fractal analysis technique.

As noted previously, the Fractal Analysis with Space-Time (FAST) coordinate conversion can be employed in medical diagnosis to interpret a time varying physiological phenomenon. FIG. 2 illustrates a five-wire electrocardiogram (ECG) 30 to which the leads 36 from electrodes on the patient 34 are connected. The ECG signals are fed to a plotter 38 which produces a graphical plot 40 of the cardiac signals. A commercially available computer scanner 42 may be employed to convert the physical plot of the signals into image data for storage in a personal computer 44. Alternatively, if the computer 44 is located in close proximity to the ECG 30 during signal acquisition, the cardiac signals can be fed directly to the computer 44 which transforms the data into a two-dimensional image format, as though a physical plot was scanned by device 42. It is noteworthy that, when comparing the fractal dimensions of a set of plots or images, the "aspect ratio" (the length and the breadth of the image) should be the same for all images. Otherwise, this will affect the fractal dimension value, and could lead to faulty analysis and diagnosis.

With either input method the result is an image stored in the personal computer 44 which then is processed by the fractal image analysis software. The software is basically a box counting program, wherein different size boxes are used to "cover-up" the signal trace being analyzed. This process yields an average fractal dimension DF that is accurate to seven significant digits.

It has been suggested that chaotic dynamical systems act as an organizer of the complex, nonlinear biomedical processes, and that the transition from chaotic to periodic processes indicates a loss of the "adaptive" capabilities of these systems. This change in chaos dynamics of the temporal signal can be converted to a change in fractal geometry of the spatial signal. This fractal property then serves as a possible indicator of an emergent pathological condition. In other words, decreased variability and accentuated periodicity will be reflected in changes of fractal values and associated with a pathological condition. For example, the presence of "adaptive" chaotic components has been found to be a necessary characteristic of a healthy biological system. The healthy heartbeat shows more complex fluctuations (more heterogeneity) when compared to the diseased heart rate fluctuation pattern that is close to "random walk" (Peng et al., "Long-Range Anticorrelations and Non-Gaussian Behavior of the Heartbeat", *Phys. Rev. Letts.*, 70(9), 1343–1346, 1993). A method of estimating or measuring this degree of heterogeneity or a way of characterizing the different states by a 'lumped' parameter would be helpful. This is the essence of the FAST technique.

Figure 4A:
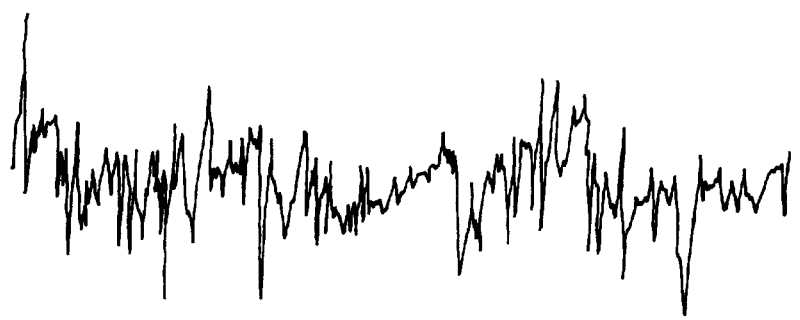
FIGS. 4A and 4B are electrocardiograph interbeat intervals for a healthy human and one with dilated cardiomyopathy, respectively.
Figure 4B:
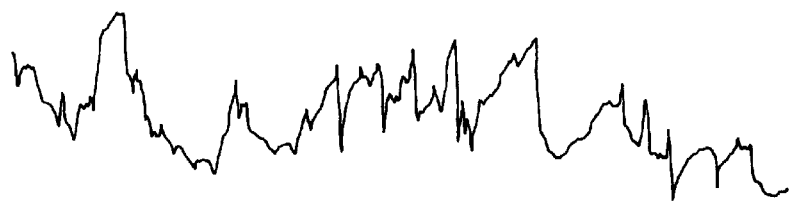

FIG. 4A illustrates the interbeat cardiac interval $B_L$ (n) after low-pass filtering for a healthy subject, while FIG. 4B shows the interbeat cardiac interval for a patient with severe cardiac disease, specifically dilated cardiomyopathy. The results of performing fractal analysis on these electrocardiographs produces a fractal dimension of 1.4374 for the healthy subject and 1.1838 for the signal indicative of severe cardiac disease. This represents a 17.6 percent change in the fractal dimension. This decrease in the fractal dimension value indicates a decrease in the heterogeneity of the electrocardiograph. Thus the value of the fractal dimension produced by this analysis method can be used as indicative of the healthiness of the human heart.

Figure 5A:
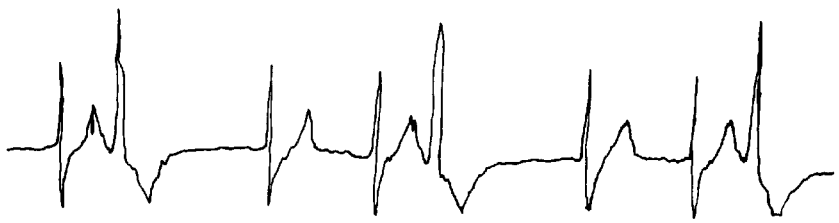
FIGS. 5A and 5B are ambulatory electrocardiographs for an elderly man and a middle aged man, respectively.
Figure 5B:

FIG. 5A depicts the ambulatory electrocardiograph for an elderly man with Cheyne-Stokes breathing exhibiting episodes of ventricular trigeminy. FIG. 5B shows an ambulatory electrocardiograph for a middle aged man with frequent ectopic beats (concealed bigeminy). The results of performing fractal analysis on these electrocardiographs produces fractal dimensions ($D_F$) of 1.3285 and 1.1585 respectively. Note that the fractal dimension value for the ventricular trigeminy is about 15% higher than that observed for concealed bigeminy.

The present analysis technique also can be utilized with electroencephalogram (EEG) signals to obtain the fractal dimension, $D_F$ values for the non-seizure, transition, and seizure states in epilepsy. There are small changes (decreases) in the $D_F$ values (3–7%) when one compares the non-seizure state to the transition and seizure states. The decrease in the $D_F$ value (or degree of heterogeneity) of the signal with the onset of a pathological condition is consistent with current theory. Even though the changes in $D_F$ exhibited are small as one goes from one behavioral state to another, the simple and rapid diagnostic procedure does demonstrate potential as a useful method to provide physical insights into the complex dynamics of biomedical processes.

The Fast method has several advantages. First of all, the fractal dimension values are obtained very quickly, no reconstruction of the data or "filtering" is required. Further, unlike Fourier Transform techniques, sophisticated computer software programs are not required nor are complex transformation of data into phase coordinates (x,v) like with some chaos dynamics analysis procedures. The potential for a real-time and on-line diagnosis system exists in which the method provides a continuous stream of $D_F$ values. This should be of assistance in helping to predict (and to possibly control) the onset of a pathological condition, which is indicated by a change in the $D_F$ value.

Fractal analysis also can employed to diagnose cancer cells and tissues. This application does not involve a space-time transformation of coordinates. Fractals have been traditionally used to define the heterogeneity of spatial structures. Since the structures of cancer cells (tissues) are different from that of normal cells (tissues), it is possible to use a spectroscopic fractal analyzer (SFA) of the two-dimensional images of cells and tissues for cancer and other diseases diagnosis. The results of fractal analysis indicates that the fractal dimension of cells has great potential to provide a simple parameter to screen for cell malignancy. Prior to analysis, the cell image photographs were processed by cleaning out the shaded areas as the FractalVision™ program distinguishes between only white and black areas.

Figure 3:
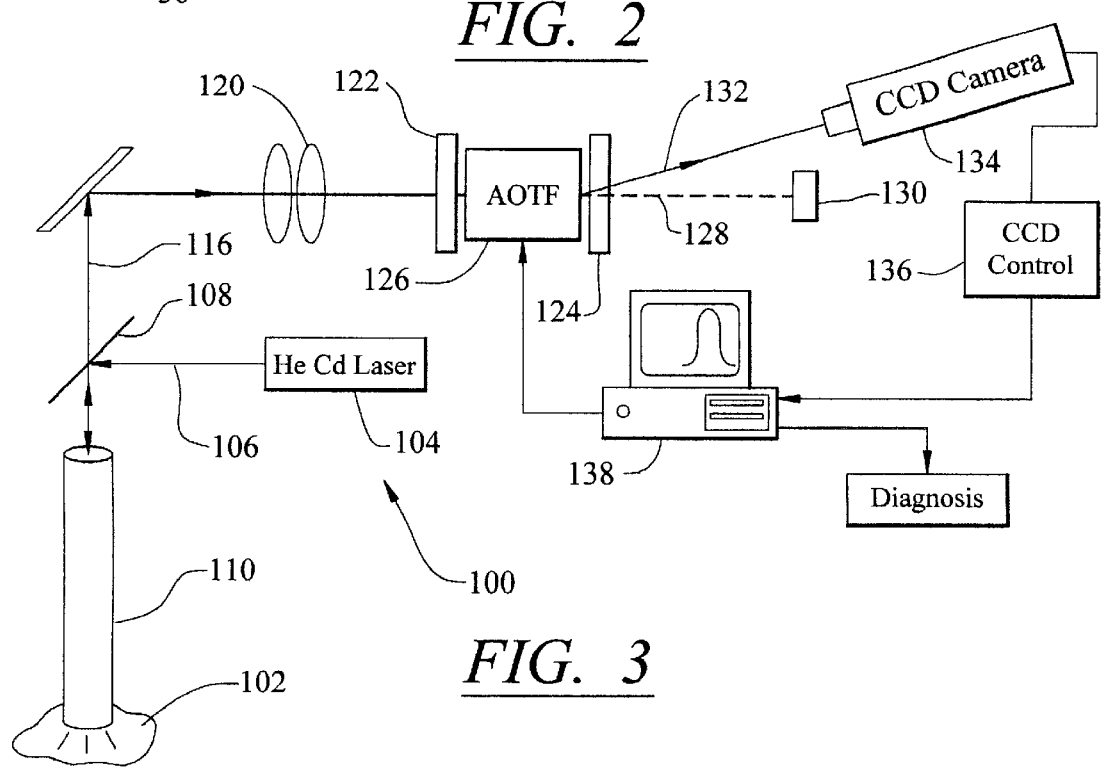
FIG. 3 is a block diagram of a spectral imaging surface-enhanced Raman scattering spectrometer.

The Fractal Analyzer can use fluorescence, reflection, absorption, Raman techniques (or other spectroscopic methods) to analyze the fractal dimension of the image and relate it to a physiological condition. With reference to FIG. 3, a Raman imaging system 100 is used to measure the spectroscopy signals emanating from a substance 102 under analysis. The imaging system 100 includes, for example, a 5 mW helium-cadmium (He—Cd) laser 104 that produces an output beam 106 having a wavelength of 325 nm. The laser beam 106 is directed to a beam splitter 108 which reflects the beam into an imaging fiber optic probe 110, such as one from Schott Fiber Optics, South Bridge, Massachusetts, USA comprising a coherent optical fiber bundle in which the relative position of each fiber is the same at both the input and output ends. Each optical fiber could be associated with a pixel and its size determines the resolution of the transmitted images. Another type of probe is described in U.S. Pat. No. 5,864,397, the description of which is incorporated herein by reference.

The fiber optic probe 110 directs the laser beam 106 onto the substance 102. The monochromatic incident light strikes the molecules of the sample thereby producing scattered radiation, some of which reenters the fiber optic probe 110. The light beam produced by that scattered radiation exits the other end of the fiber optic probe 110 and passes through the beam splitter 108 as resultant beam 116. A mirror 118 redirects the resultant beam 116 through an imaging lens 120 which focuses the beam through a first polarizer 122 onto the input of an acousto-optic tunable filter (AOTF) 126. The acousto-optic tunable filter 126, such as model TEAF 10-45-70-S produced by Brimrose Corp. of America, Baltimore, Md. U.S.A., is tuned by a signal from a personal computer 138. By changing the wavelength to which the acousto-optic tunable filter 126 is tuned, a spectrum can be acquired as a series of images with one image for each wavelength.

The output of the acousto-optic tunable filter 126 comprises an unrefracted beam 128 which strikes a beam blocker 130 and a refracted beam 132 at an angle of 5.5° from the unrefracted beam. Both these beams travel through another polarizer 124 with the refracted beam 132 entering a CCD camera 134. It should be noted that polarizers 122 and 124 are only required for certain types of acousto-optic tunable filters. For example, the CCD camera 134 operates in the spectral range 330 to 1100 nm and has a resolution of 750×242 pixels with two pixel horizontal binning which gives an effective resolution of 375×242 pixels. The CCD camera 134 is operated by a controller 136 that is based on an IBM 8088 microprocessor with an 8 kHz clock signal.

The CCD controller 136 is coupled to a conventional personal computer 138 which receives the signal for the two-dimensional image from the camera 134 and stores the image in memory. The personal computer 138 then performs fractal analysis on the image as described previously.

What is claimed is:

1. A method for analyzing time domain data representing characteristics of temporal events, said method comprising the steps of:

receiving said time domain data;

converting said time domain data into a continuous spatial domain representation of said temporal events; and performing fractal analysis on the said continuous spatial domain representation derived from said time domain data, thereby producing a fractal dimension $D_F$ indicative of heterogeneity of said time domain data.

2. The method as recited in claim 1 wherein the temporal events are produced by a physiological function of an animal.

3. The method as recited in claim 2 further comprises diagnosing a pathological condition in response to the value of the fractal dimension $D_F$.

4. The method as recited in claim 1 wherein the step of converting comprises creating a plot of the time domain data; scanning the plot to produce image data; and storing the image data into a computer.

5. The method as recited in claim 4 wherein the step of performing fractal analysis analyzes image data which was stored into the computer.

6. The method as recited in claim 1 wherein the step of converting comprises transforming the time domain data into multi-dimensional image data; and storing the multi-dimensional image data into a computer.

7. The method as recited in claim 6 wherein the step of performing fractal analysis processes the multi-dimensional image data which was stored into the computer.

8. The method as recited in claim 1 wherein the time domain data is spectroscopy data.

9. The method of claim 1, wherein said converting comprises time-to-space coordinate conversion, wherein a waveform representing said time domain data is preserved upon said conversion.

10. The method of claim 9, wherein following said coordinate conversion, said fractal analysis directly analyzes said waveform.

11. A method for analyzing characteristics of a time varying phenomenon represented by an electrical signal, said method comprising the steps of:

receiving said electrical signal;

converting said electrical signal from a time domain into a continuous spatial domain representation of said electrical signal; and performing fractal analysis on said continuous spatial domain representation of the electrical signal thereby producing a fractal dimension $D_F$ associated with said time varying phenomenon.

12. The method as recited in claim 11 wherein the step of converting comprises transforming the electrical signal in the time domain into a multi-dimensional image; and storing the image into a computer.

13. The method as recited in claim 12 wherein the step of performing fractal analysis analyzes multi-dimensional graphical image which was stored into the computer.

14. The method as recited in claim 11 wherein the electrical signal represents a physiological function of an animal.

15. The method as recited in claim 14 further comprises diagnosing a pathological condition of the animal in response to the value of the fractal dimension $D_F$.

16. A method for analyzing physiological activity of an animal, said method comprising the steps of:

sensing said physiological activity and producing an electrical signal representative of that physiological activity;

converting said electrical signal from a time domain into a spatial domain representation of said electrical signal; and performing fractal analysis on the spatial domain representation of said electrical signal thereby producing a fractal dimension $D_F$ indicative of regularity of said physiological activity.

17. The method as recited in claim 16 wherein the step of converting comprises creating a plot of the time domain data; scanning the plot to produce image data; and storing the image data into a computer.

18. The method as recited in claim 17 wherein the step of performing fractal analysis analyzes image data which was stored into the computer.

19. The method as recited in claim 14 further comprises diagnosing a physiological condition of the animal in response to a value of the fractal dimension $D_F$.

20. A method for analyzing spectroscopy data derived from a sample; said method comprising the steps of:

receiving said spectroscopy data, said spectroscopy data being derived from an optical spectroscopic technique capable of providing functional information regarding said sample;

producing an image from said spectroscopy data, said image providing said functional information regarding said sample; and performing fractal analysis on said image to obtain a fractal dimension $D_F$.

21. The method as recited in claim 20 wherein the step of producing an image produces a multi-dimensional image from the spectroscopy data.

22. The method as recited in claim 20 further comprising storing the image into a computer.

23. The method as recited in claim 22 wherein the step of performing fractal analysis analyzes the image which was stored into the computer.

24. The method as recited in claim 20, wherein said optical spectroscopic technique is at least one selected from the group consisting of fluorescence, reflection and Raman spectroscopy.

25. The method as recited in claim 20, wherein said sample comprises a biological sample.

26. The method as recited in claim 25, wherein said biological sample comprises at least one cell.

27. The method as recited in claim 20, further comprising the step of relating said fractal dimension $D_F$ to a disease state in said sample.

* * * * *